United States Patent
Chou et al.

(10) Patent No.: US 7,672,143 B2
(45) Date of Patent: Mar. 2, 2010

(54) CARD HOLDER AND BRACKET IN COMPUTER SYSTEM

(75) Inventors: Chi-Wen Chou, Taipei (TW); Hsiu Hsien Wang, Taipei (TW)

(73) Assignee: Hewlett-Packard Development Company, L.P., Houston, TX (US)

( * ) Notice: Subject to any disclaimer, the term of this patent is extended or adjusted under 35 U.S.C. 154(b) by 128 days.

(21) Appl. No.: 11/807,641

(22) Filed: May 30, 2007

(65) Prior Publication Data
US 2008/0298010 A1 Dec. 4, 2008

(51) Int. Cl.
*H05K 7/12* (2006.01)
(52) U.S. Cl. .................. 361/801; 361/759; 361/747; 361/756
(58) Field of Classification Search ................ 361/801, 361/741, 756, 802, 726, 732, 747, 759, 740
See application file for complete search history.

(56) References Cited

U.S. PATENT DOCUMENTS

| | | | |
|---|---|---|---|
| 5,544,006 A | 8/1996 | Radloff et al. | |
| 5,594,627 A * | 1/1997 | Le | 361/801 |
| 5,715,146 A | 2/1998 | Hoppal | |
| 5,914,854 A * | 6/1999 | Holt | 361/679.23 |
| 6,381,149 B1 * | 4/2002 | Megason et al. | 361/801 |
| 6,430,056 B1 * | 8/2002 | Chen | 361/759 |
| 6,556,451 B1 | 4/2003 | Feightner et al. | |
| 6,735,091 B2 * | 5/2004 | Megason et al. | 361/801 |
| 6,764,330 B1 | 7/2004 | Chen | |
| 6,814,607 B1 * | 11/2004 | Wentzel | 439/377 |
| 7,130,200 B1 * | 10/2006 | Liu | 361/801 |
| 7,564,697 B2 * | 7/2009 | Chen | 361/801 |
| 7,593,238 B2 * | 9/2009 | Tang | 361/801 |
| 2002/0109977 A1 * | 8/2002 | Megason et al. | 361/801 |

OTHER PUBLICATIONS

VersaView Industrial Workstations 1200W, 1500W, User Manual, Publication 6180W-UM001G-EN-P, Sep. 2005, pp. 4-2 to 4-5.
PCI Local Bus Specification, Revision 2.2, Dec. 18, 1998, pp. 153-165.

* cited by examiner

*Primary Examiner*—Dameon E Levi (57) ABSTRACT

In a computer system, a card holder is removably attached to a bracket to hold an add-in card in an I/O connector. The card holder is capable of being slid onto the bracket and a side edge of the add-in card.

14 Claims, 7 Drawing Sheets

CARD HOLDER AND BRACKET IN COMPUTER SYSTEM

BACKGROUND

Computer systems typically have add-in cards attached to internal I/O (input/output) connectors. Such add-in cards include network interface cards, modem cards, television tuner cards, graphics cards and many others. The add-in cards usually conform to various industry standards and enhance the functionality of the computer system.

The add-in card typically includes a printed circuit board, a portion of one edge of which is formed into a card edge connector, with several conductor leads, for inserting into the I/O connector. The I/O connector is typically mounted on a mother board or a riser board that is connected to the mother board. The add-in card also typically has a card bracket attached to one end of the printed circuit board. The card bracket is used to secure the add-in card to a chassis of the computer system.

The opposite edge of the add-in card from the card bracket is often not connected to anything. However, this opposite edge, particularly for relatively long add-in cards, is sometimes constrained to prevent unwanted movement of the add-in card. Due to space limitations, though, it is not always possible to have a constraint mechanism within the computer system. This situation leaves the add-in card and the computer system vulnerable to potential damage due to shock and vibration during handling, transportation and operation of the computer system.

DETAILED DESCRIPTION

Figure 1:
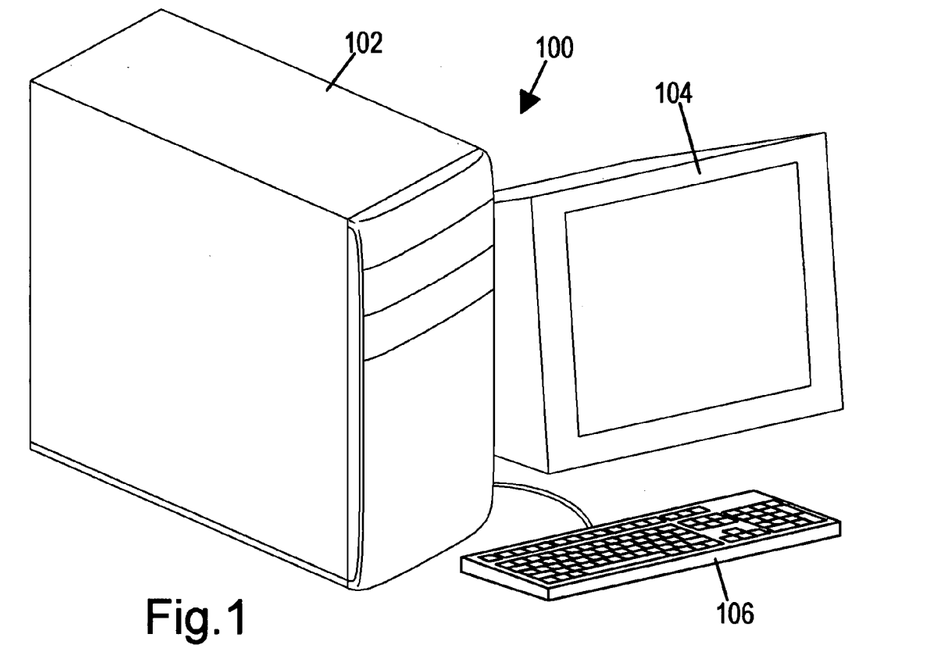
FIG. 1 is a perspective view of an exemplary computer system incorporating an embodiment of the present invention.

An exemplary computer system 100, generally including a computer enclosure 102, a display 104 and a keyboard 106, is shown in FIG. 1. As will be described below, the computer system 100 includes a mechanism within the enclosure 102 that constrains the end (the "free end") of an add-in card opposite the end that has a card bracket, thereby reducing the potential for damage due to shock and/or vibration during handling, transportation and/or operation of the computer system 100. Such mechanism for constraining, retaining or holding an add-in card in a computer system is available even though there are strict limitations in available space because of the incorporation of a specialized bracket located near the free end of the add-in card. This bracket allows for a specialized "card holder" to slide onto the free end of the add-in card and lock in place onto the bracket. The card holder and bracket, thus, constrain movement and/or vibration of the add-in card, thereby reducing the potential for damage to the computer system 100.

The computer system 100 is shown and described herein as having a mini-tower configuration for the enclosure 102. However, it is understood that the invention is not so limited, but may apply to any computer or electronic device configuration or design that includes one or more locations for add-in cards, as described below.

Figure 2:
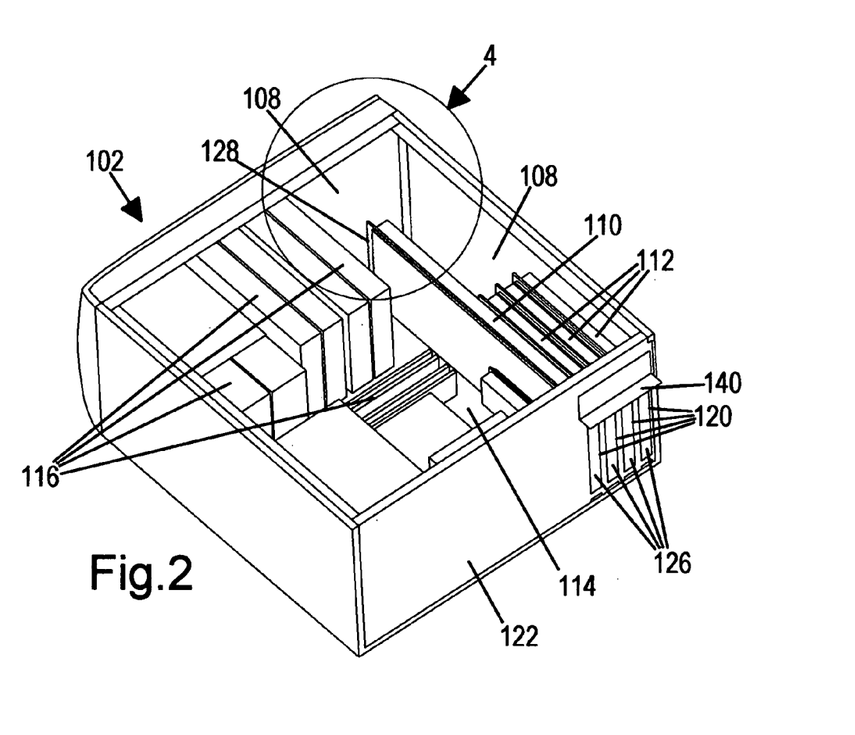
FIG. 2 is a perspective view of a portion of the exemplary computer system shown in FIG. 1 incorporating an embodiment of the present invention.

The enclosure 102, as shown in FIG. 2, generally includes a chassis 108 and "slots" for various add-in cards 110 and 112 mounted on a mother board 114 (i.e. a main system printed circuit board) among a wide variety of other electronic and mechanical components 116. The add-in cards 110 and 112 are illustrated and described as conforming to the PCI (Peripheral Component Interconnect) specification for full length cards (add-in card 110) and short cards (add-in cards 112). However, it is understood that the invention is not so limited, but may apply to any add-in card standard, configuration or design that includes features the same or similar to those described below.

Card edge I/O connector receivers 118 (FIG. 3) are mounted on the mother board 114 for each add-in card slot. The card edge I/O connector receivers 118 are aligned with elongated openings 120 (FIG. 2) in a rear wall 122 of the chassis 108. According to the illustrated embodiment, the elongated openings 120 are flush with the rear wall 122, instead of being recessed toward the interior of the chassis 108, so as to allow for as much space in the interior of the chassis 108 as possible, given design limitations on the size of the enclosure 102.

Figure 4:
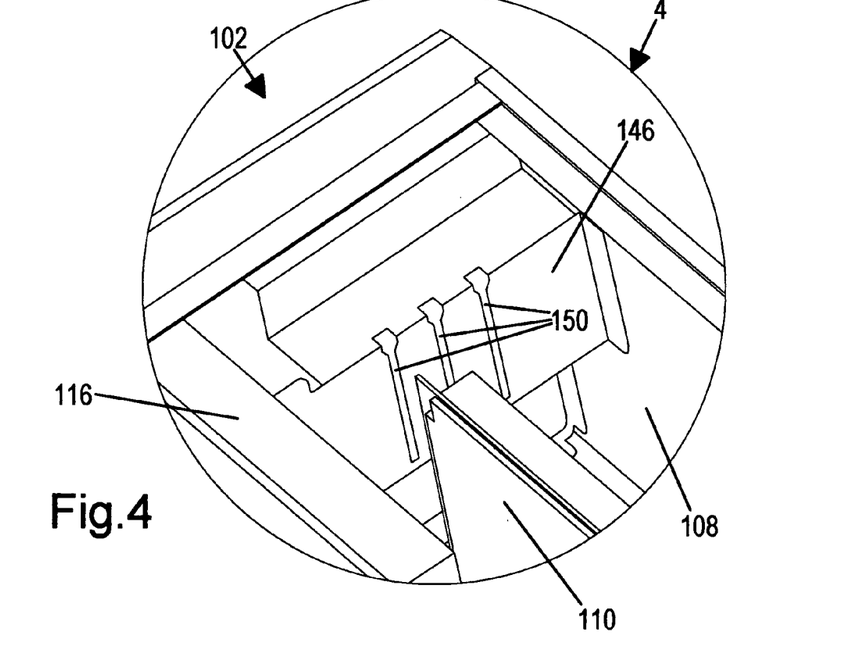
FIG. 4 is a perspective view of an enlarged portion of the exemplary computer system shown in FIG. 1 with a card holder bracket and incorporating an embodiment of the present invention.
Figure 5:
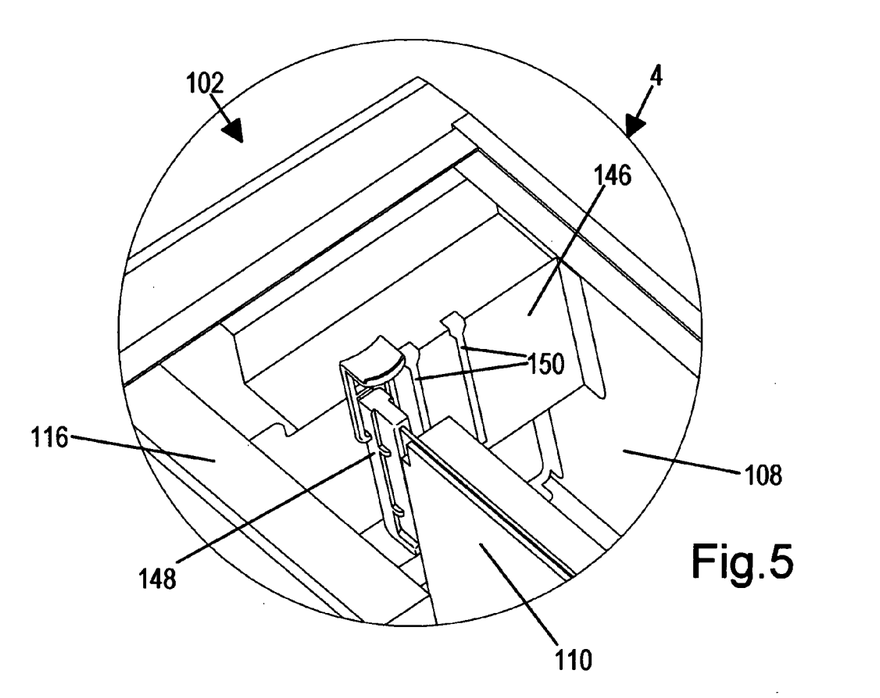
FIG. 5 is a perspective view of the enlarged portion of the exemplary computer system shown in FIG. 4 with a card holder and incorporating an embodiment of the present invention.

The add-in card 110 generally has a printed circuit board 124, a card bracket 126 and an optional card retainer 128. The card bracket 126 attaches to a bracketed side edge 130 of the printed circuit board 124. The optional retainer 128, if it is included, attaches to a free end side edge 132 opposite the bracketed side edge 130. (By way of example, the optional retainer 128 is shown only in FIG. 3, while FIGS. 2, 4 and 5 show the add-in card 110 without the optional retainer 128.) The printed circuit board 124, on a bottom edge 134 thereof, has a portion with electrical leads to form a card edge connector 136. The card edge connector 136 matches and mates with the card edge I/O connector receiver 118.

For clarity, a space between the optional retainer 128, or the free end side edge 132, of the full length add-in card 110 and the chassis 108 is shown as empty. However, in some configurations, this space is occupied by other components, the presence of which strictly limits the available space for full length add-in cards, such as the add-in card 110. To make the most of available space in this embodiment, the chassis 108 is designed so that the card brackets 126 for the add-in cards 110 and 112 can be attached all the way up against the rear wall 122 of the chassis 108. In doing so, a top rearwardly extending portion 138 of the card brackets 126 (see FIG. 3) extends outside of the rear wall 122. An exterior overhanging guard plate 140 (FIG. 2), thus, covers and protects the otherwise exposed top rearwardly extending portion 138 of the card brackets 126.

Figure 3:
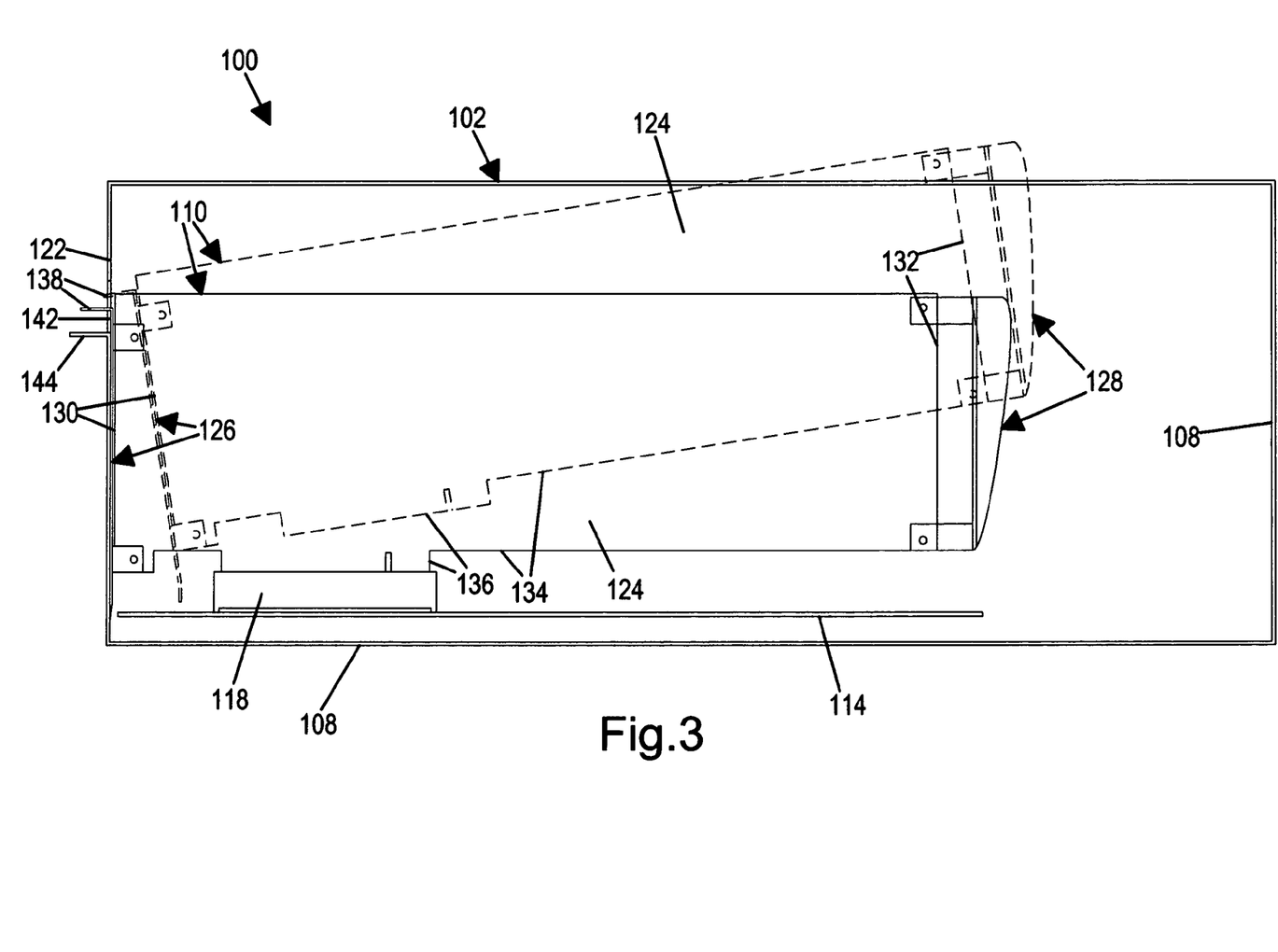
FIG. 3 is a side view of a portion of the exemplary computer system shown in FIG. 1 including an add-in card and incorporating an embodiment of the present invention.

To install the add-in card 110 in the enclosure 102, the add-in card 110 is maneuvered into the chassis 108 at an angle, as indicated by the dashed lines in FIG. 3, until the top rearwardly extending portion 138 of the card bracket 126 is exposed through a hole 142 in the rear wall 122. The add-in card 110 is then rotated to the position shown in solid lines. In this position, the card edge connector 136 is aligned with the card edge I/O connector receiver 118. The add-in card 110 can then be pushed downward to fully insert the card edge connector 136 into the card edge I/O connector receiver 118. The top rearwardly extending portion 138 of the card bracket 126 can then be secured to a protrusion 144 from the rear wall 122 of the chassis 108 in any appropriate manner to constrain the end of the add-in card 110 at the bracketed side edge 130.

During the maneuvering of the add-in card 110 into the enclosure 102, the optional retainer 128 (or the free end side edge 132) encroaches into the space between the optional retainer 128 (or the free end side edge 132) and the chassis 108 due to the design (described above) of the rear wall 122 in this embodiment. As a consequence, it is not possible to have any fixed components, including a card retaining mechanism, located in this space too close to the optional retainer 128 (or the free end side edge 132). This problem is solved by a bracket 146 and a removable card holder 148, as shown in FIGS. 4 and 5 (enlargement of portion 4 in FIG. 2). The removability of the card holder 148 alleviates the problem of space limitations within the enclosure 102.

According to some embodiments, the bracket 146 is preferably of formed sheet metal or other appropriate material. The bracket 146 is secured to the chassis 108, or other component within the enclosure 102, in any appropriate manner. The bracket 146 may separate the optional retainer 128 (or the free end side edge 132) from any other components disposed between the optional retainer 128 (or the free end side edge 132) and the chassis 108. The bracket 146 has a number of vertical slots 150 corresponding to the locations available for full length add-in cards (e.g. add-in card 110). Various embodiments for the general shape of the bracket 146, as shown in detail in FIG. 6, may be dictated by the need to have the slots 150 align with the full length add-in cards 110, the presence of other components which the bracket 146 must avoid, the need for air ventilation and/or the location of support structures (e.g. the chassis 108) to which the bracket 146 may be mounted, among other considerations. Therefore, the exact shape of the bracket 146 shown is exemplary only, and not limiting of the invention.

According to various embodiments, the card holder 148 is preferably of molded plastic or other appropriate material. The card holder 148 may be inserted into the slots 150 of the bracket 146 and locked in place as described below. Upon being inserted into the slot 150 that corresponds to the full length add-in card 110, the card holder 148 also slides down onto the edge of the optional retainer 128 or, if the add-in card 110 has no retainer 128, the free end side edge 132 of the printed circuit board 124. In this position, the card holder 148 covers at least a portion of either the edge of the optional retainer 128 or the free end side edge 132, including a top edge corner thereof. In this manner, the card holder 148 and the bracket 146 constrain movement and/or vibration of the add-in card 110 at the optional retainer 128 and/or the free end side edge 132 of the printed circuit board 124. Therefore, various embodiments for the general shape of the card holder 148, as shown in detail in FIGS. 7 and 8, may be dictated by the size and shape of the slot 150, the size and shape of the optional retainer 128 or of the free end side edge 132 and their positions relative to each other. Therefore, the exact shape of the card holder 148 shown is exemplary only, and not limiting of the invention.

Figure 6:
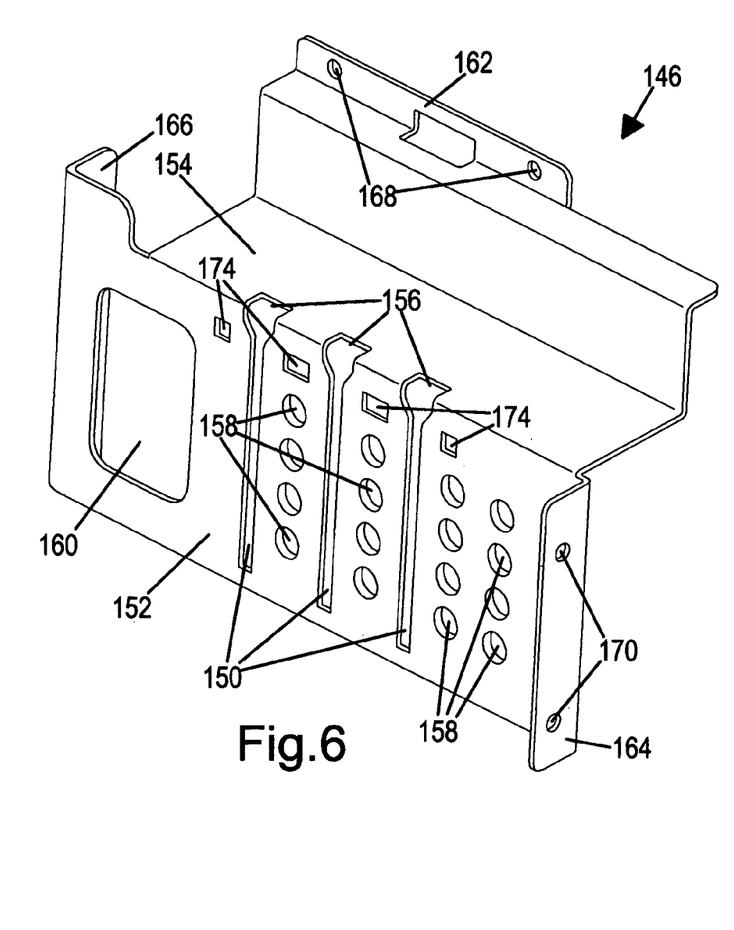
FIG. 6 is a perspective view of the card holder bracket shown in FIGS. 4 and 5 incorporating an embodiment of the present invention.
Figure 11:
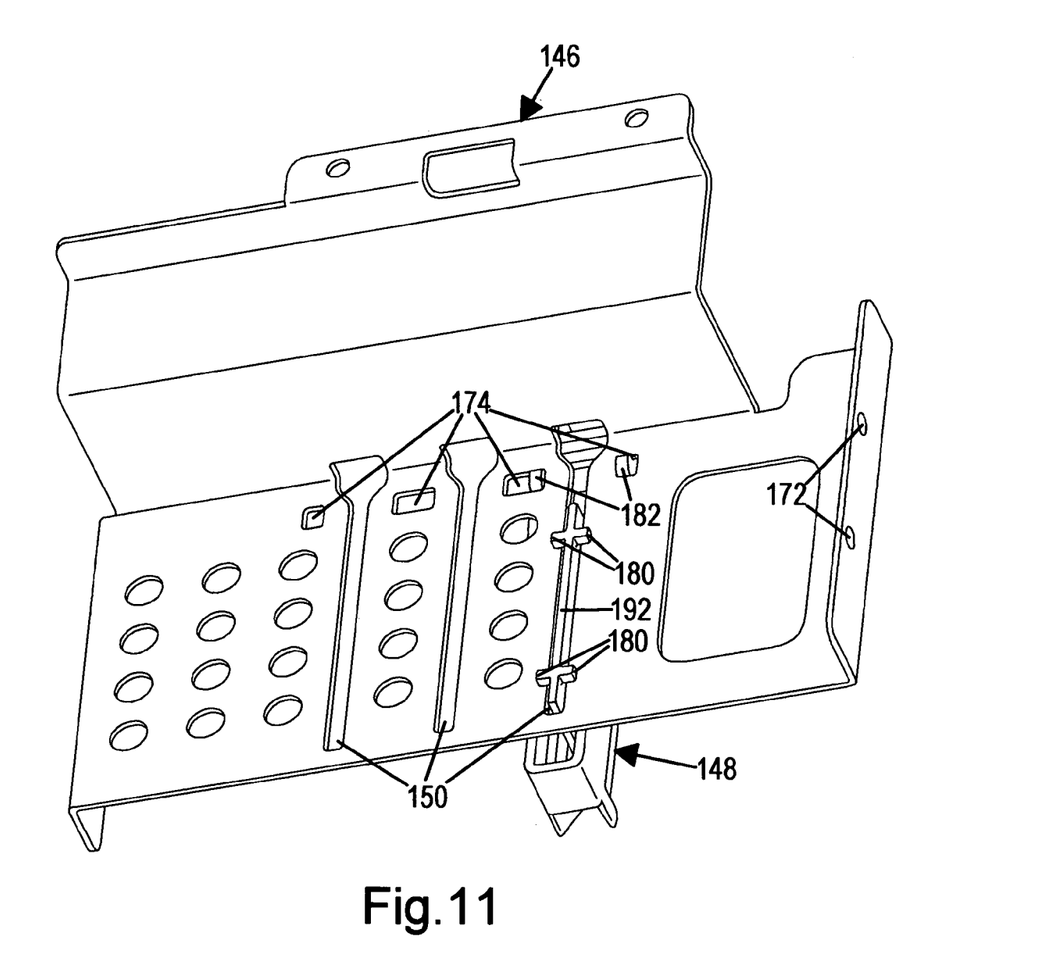
FIG. 11 is still another perspective view of the card holder bracket and card holder shown in FIGS. 4-10 incorporating an embodiment of the present invention.

According to the specific embodiment shown in FIG. 6, the bracket 146 has the slots 150 in a vertical side 152 that is generally parallel to the optional retainer 128 and/or the free end side edge 132, which are perpendicular to a plane of the mother board 114 (FIGS. 2 and 3). At the top of the vertical side 152, the bracket 146 angles into a horizontal portion 154, so the slots 150 have a top open portion 156 that is open and accessible for the card holder 148 from above. The bracket 146 also has a variety of vent holes 158 and 160 to allow air to pass through the bracket 146, e.g. for cooling some of the electronic components. Additionally, the bracket 146 has appropriately located flanges 162, 164 and 166 with mounting holes 168, 170 and 172, respectively, so the bracket 146 can be mounted to the chassis 108 or other structure in the enclosure 102, e.g. using rivets, screws or other appropriate devices. (Mounting holes 172 are not visible in FIG. 6, but in FIG. 11.) Furthermore, the bracket 146 has locking holes 174 located in the vertical side 152 on opposite sides of the slots 150.

Figures 7, 8:
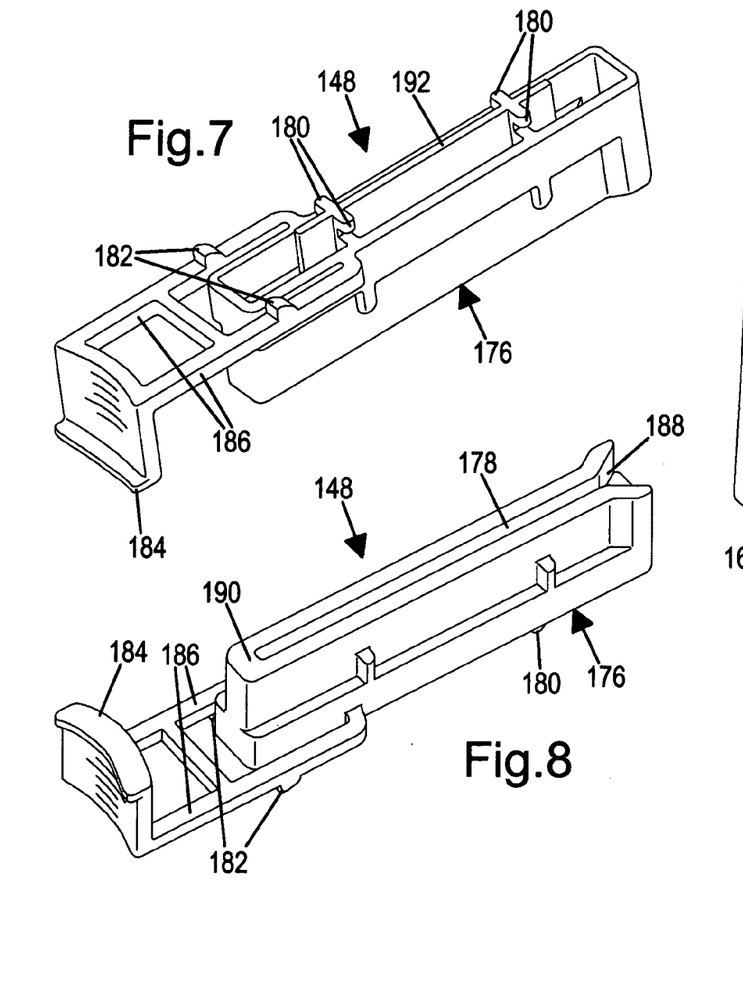
FIG. 7 is a perspective view of the card holder shown in FIG. 5 incorporating an embodiment of the present invention.
FIG. 8 is another perspective view of the card holder shown in FIGS. 5 and 7 incorporating an embodiment of the present invention.

According to the specific embodiment shown in FIGS. 7 and 8, the card holder 148 generally has a main body 176, a groove 178, bracket engaging protrusions 180, locking protrusions 182, a release handle 184 and flexible arms 186, among other elements. The groove 178 is on a card-facing side of the main body 176 and extends from an open bottom end 188 to a closed top end 190. The bracket engaging protrusions 180 are on a bracket-facing side of the main body 176 and protrude laterally from a longitudinal fin extension 192 of the main body 176. The locking protrusions 182 protrude from a bracket-facing side of the flexible arms 186. The flexible arms 186 extend from opposite sides of the main body 176 to the release handle 184 above the main body 176.

Figure 9:
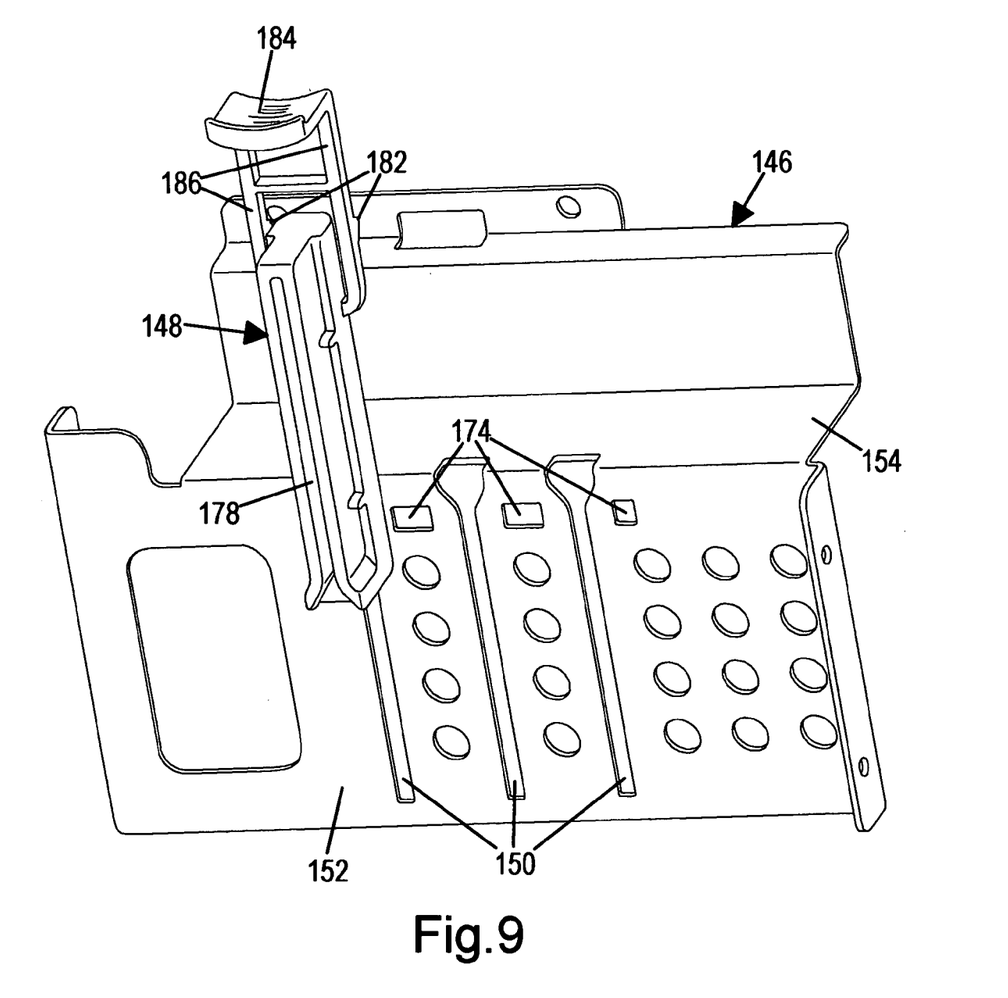
FIG. 9 is a perspective view of the card holder bracket and card holder shown in FIGS. 4-8 incorporating an embodiment of the present invention.
Figure 10:
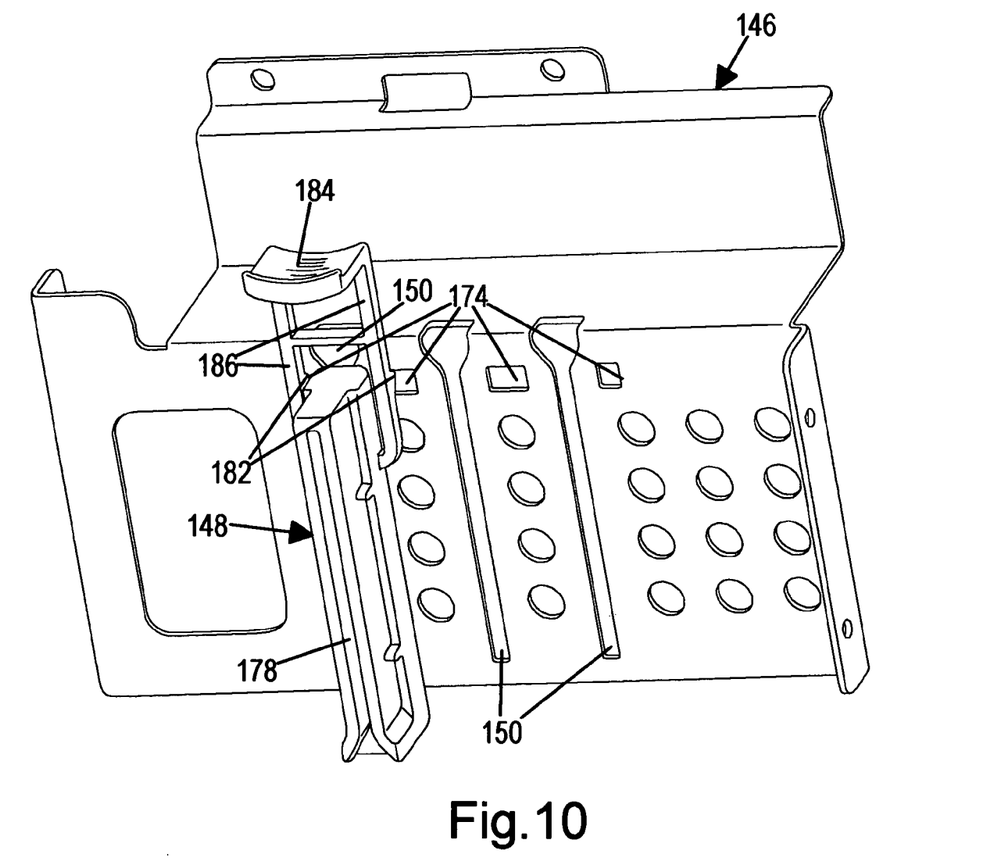
FIG. 10 is another perspective view of the card holder bracket and card holder shown in FIGS. 4-9 incorporating an embodiment of the present invention.

To attach the card holder 148 to the bracket 146 and either the optional retainer 128 or the free end side edge 132 of the add-in card 110, the card holder 148 is first placed in the position shown in FIG. 9 at the top open portion 156 of the slot 150. Then the groove 178 of the card holder 148 is slid down onto the optional retainer 128 (or the free end side edge 132) as the bracket engaging protrusions 180 are inserted through the top open portion 156 of the slot 150 in the bracket 146. The card holder 148 is thus slid down to the position shown in FIGS. 10 and 11 (see also FIG. 5), with the bracket engaging protrusions 180 on one side of the bracket 146 and the rest of the card holder 148 on the opposite side of the bracket 146. Upon reaching the position shown in FIGS. 10 and 11, the locking protrusions 182 snap into the locking holes 174 on both sides of the slot 150, thereby locking the card holder 148 in place on the bracket 146. In this position, the card holder 148 fully engages at least a portion of either the edge of the optional retainer 128 or the free end side edge 132, including a top edge corner thereof, thereby constraining the full length add-in card 110 against unwanted movement and/or vibration. (See FIG. 5.)

To remove the card holder 148, the release handle 184 is pushed away from the bracket 146. The flexible arms 186 are thus bent away from the vertical side 152 of the bracket 146. In this manner, the locking protrusions 182 are pulled out of the locking holes 174 on opposite sides of the slot 150, thereby releasing the card holder 148 from the bracket 146. The card holder 148 can then be pulled up away from the add-in card 110 and out of the enclosure 102. Once the card holder 148 has been removed, the add-in card 110 can be removed by reversing the above described installation procedure.

We claim:

1. A computer system comprising:

a housing;

an I/O connector disposed within the housing;

an add-in card removably attached to the I/O connector;

a bracket mounted in the housing near a side edge of the add-in card, the bracket having a side with a slot formed therethrough, the slot extending from an edge of the side; and a card holder removably positioned between the bracket and the add-in card, the card holder having a longitudinal extension and two pairs of bracket engaging protrusions and a longitudinal extension extending therebetween, wherein each pair of bracket engaging protrusions extends from opposing sides of the longitudinal extension;

wherein the longitudinal extension and the bracket engaging protrusions of the card holder are inserted through the slot of the bracket, whereby the bracket and card holder are releasably coupled.

2. A computer system as defined in claim 1, wherein:

the card holder further comprises a groove receiving at least a portion of a side edge of the add-in card.

3. A computer system as defined in claim 1, wherein:

the bracket further comprises two locking holes disposed on opposite sides of the slot, each locking hole receiving a locking protrusion on the card holder, whereby the card holder snaps into the bracket.

4. A computer system as defined in claim 1, wherein:

the card holder reduces shock and vibration of the add-in card.

5. A computer system as defined in claim 1, further comprising:

a printed circuit board on which the I/O connector is mounted;

and wherein a side edge of the add-in card is perpendicular to a plane of the printed circuit board.

6. A computer system as defined in claim 1, wherein:

the add-in card further comprises a printed circuit board and a retainer attached at an end edge of the printed circuit board; and a side edge of the add-in card is part of the retainer.

7. A computer system as defined in claim 1, wherein:

the add-in card has a printed circuit board and a retainer attached to a free end side edge of the printed circuit board; and the retainer forms a side edge of the add-in card.

8. A mechanism for holding an add-in card in a computer system, comprising:

a bracket adapted to be mounted in the computer system, the bracket having a side with a slot formed therethrough, the slot extending from an edge of the side; and a card holder removably attachable to the bracket, the card holder having an opened ended groove configured to receive a portion of a side edge of the add-in card, two pairs of bracket engaging protrusions, and a longitudinal extension extending therebetween, wherein each pair of bracket engaging protrusions extends from opposing sides of the longitudinal extension;

wherein the longitudinal extension and the bracket engaging protrusions of the card holder are inserted through the slot of the bracket, whereby the bracket and card holder are releasably coupled.

9. A mechanism as defined in claim 8, wherein:

the groove has an inner surface that matches at least a portion of an outer surface of the side edge and the corner of the add-in card.

10. A mechanism as defined in claim 8, wherein:

the card holder reduces shock and vibration of the add-in card in the computer system.

11. A mechanism for holding an add-in card in a computer system, comprising:

a means for engaging a side edge of the add-in card, including a top corner thereof; and a means for removably mounting the engaging means and configured to be installed in the computer system;

wherein the engaging means is slideable onto the means for removably mounting and receives a portion of the side edge of the add-in card, whereby the engaging means is locked in place to constrain the add-in card.

12. A method for installing and supporting an add-in card in a computer system, comprising:

inserting the add-in card into an I/O connector within the computer system, the computer system having a bracket near a side edge of the installed add-in card; and sliding a card holder onto the bracket; the sliding further comprises sliding a portion of the card holder through a slot in the bracket; and receiving the side edge of the add-in card within the card holder to constrain the side edge including a corner thereof; the receiving comprises receiving the side edge of the add-in card within a groove in the card holder.

13. A method as defined in claim 12, wherein:

the sliding further comprises sliding the card holder onto the bracket and the side edge of the add-in card until the card holder locks in place on the bracket.

14. The method of claim 13, further comprising:

removing the card holder from the bracket prior to removing the add-in card from the card holder.

* * * * *